United States Patent
Buonpane et al.

[19]

[11] Patent Number: 5,977,864
[45] Date of Patent: Nov. 2, 1999

[54] HIGH SPEED COMPARATOR WITH BIT-WISE MASKING

[75] Inventors: Michael S. Buonpane, Easton; Ravi Kumar Kolagotla, Lansdale; Jiancheng Mo, Allentown, all of Pa.

[73] Assignee: Lucent Technologies Inc., Murray Hill, N.J.

[21] Appl. No.: 09/079,641

[22] Filed: May 15, 1998

[51] Int. Cl.$^6$ .................................................. G05B 1/00
[52] U.S. Cl. ............................................. 340/146.2
[58] Field of Search ...................................... 340/146.2

[56] References Cited

U.S. PATENT DOCUMENTS

| | | | |
|---|---|---|---|
| 4,958,140 | 9/1990 | Yasuda et al. | 340/146 |
| 5,880,671 | 3/1999 | Ranson et al. | 340/146.2 |

OTHER PUBLICATIONS

Proceedings of the IEEE 1997 Custom Integrated Circuits Conference May 5–8, 1997, "VLSI Implementation of a 200–MHz 16×16 Left–to–Right Carry–Free Multiplier in 0.35 $\mu$m CMOS Technology for next–generation DSPs", by Kolagotla, et al., Bell Labs, Lucent Technologies, Allentown, PA., pp. 469–472.

*Primary Examiner*—Margaret R. Wambach
*Attorney, Agent, or Firm*—David L. Smith

[57] ABSTRACT

There is disclosed, a high speed comparator with bit-wise masking takes advantage of early availability of the reference word and mask word to generate conditional select signals, thereby minimizing the time required to generate a comparator output once the input word to be compared is available.

37 Claims, 2 Drawing Sheets

HIGH SPEED COMPARATOR WITH BIT-WISE MASKING

FIELD OF THE INVENTION

This invention relates to comparators and in particular to high speed digital comparators where individual bits may be masked from comparison.

BACKGROUND OF THE INVENTION

Comparators compare each bit of two words, an input word and a reference word, to determine whether the two words are identical, that is to determine whether each bit of the two words are identical or match. A masked comparator, with masking of individual bits, compares bits of the input word and reference words that are not masked to determine whether the unmasked bits of the two words are identical. A signal is generated indicating a match when the bits that are not masked in the input word and reference words match, without regard to whether the masked bits match. Otherwise a signal is generated indicating a match has not occurred.

One technique to compare the bits of an input word and a reference word in a masked comparator is disclosed in U.S. Pat. No. 4,958,140, the disclosure of which is incorporated by reference. This technique employs a two stage circuit. In the first stage a linear array of identical cells, one for each bit position in the words being compared, operates on one bit of each of the input word, the reference word and a mask word to determine whether there is a match for that bit position and to generate a comparison signal. The second stage combines the comparison signals from each cell in the first stage. The second stage can be realized using either a single logic gate with as many inputs as there are comparison signals from the first stage, or an inverted tree of logic gates. The output from the second stage is a match or no-match signal for the comparison of the input word and a reference word.

Specifically, for each bit position, a bit of the input word is combined with a bit of the reference word to produce an intermediate first stage output for that bit position. The intermediate first stage output for that bit position is then combined with the mask bit of the corresponding bit position to produce an output for each cell. As a result, the critical path from the input of bits of the input word, reference word, and mask word, to the output of the first stage of cells includes at least two gate delays, and the time required to obtain a final determination of the comparison even longer since the intermediate outputs from the first stage provide the inputs to the second stage.

While the known comparator technique achieves the desired result very rapidly, there remains a need to reach the final comparison result more quickly.

SUMMARY OF THE INVENTION

In accordance with the invention, a high speed comparator with bit-wise masking takes advantage of early availability of the reference word and mask word to generate conditional select signals, thereby minimizing the time required to generate a comparator output once the input word to be compared is available.

DETAILED DESCRIPTION

A high speed comparator with bit-wise masking takes advantage of early availability of the reference word and mask word to generate conditional select signals, thereby minimizing the time required to generate a comparator output once the input word to be compared is available. A mask provides the flexibility to compare all bits or selected bits of an input word with a reference word. With a dynamic mask that can change between comparison operations, the selected portions of a word that can be compared need not be predetermined, but can be determined during runtime.

Masked comparators are utilized in several applications in microprocessors, microcontrollers, and digital signal processors. Masked comparators may be used in any application where a determination of whether two words are the same or different is required. One application employs a masked comparator monitoring an address on an address bus of a processor. The comparator compares the address on the address bus to a known address so as to determine which memory array data should be read from or written to.

A digital comparator with bit-wise masking computes:

$$E=(m_1+x_1 \odot r_1) \cdot (m_2 x_2 \odot r_2) \cdot \ldots \cdot (m_n+x_n \odot r_n) \quad (1)$$

where: $X(x_1, x_2, \ldots x_n)$ is an n-bit input word;
$R=(r_1, r_2, \ldots r_n)$ is an n-bit reference word;
$M=(m_1, m_2, \ldots m_n)$ is an n-bit mask word; and
n is an integer indicating the number of bits.

Rewriting equation (1), redefining terms on the right side of the equation results $$E=e_1 \cdot e_2 \cdot \ldots e_n$$

where: $e_j = m_j x_j \odot r_j$

Figure 2:
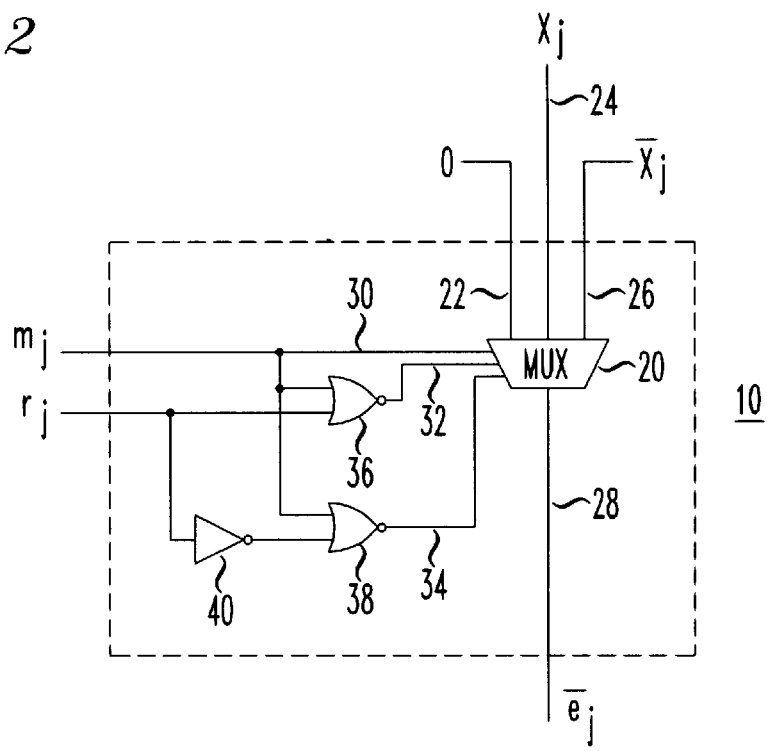
FIG. 2 is a simplified schematic diagram of a bit-level comparator for use in the comparator of FIG. 1.

When E is a logic high, the bits in the input word, X, match the corresponding bits in the reference word, R, without regard to the logic state of the bits being masked by the mask word, M. A bit-level comparator circuit 10 for use in a high speed digital comparator 12 is shown in the simplified schematic diagram of FIG. 2. In FIG. 2, j is a subscript ranging up to n denoting the $j^{th}$ bit of each of the input word, reference word, and mask word.

Although each of the reference word, mask word and input word must be available before a comparison can be made, the reference word and mask word are typically available before the input word is available. Since the reference word and mask word are typically available before the input word, they may be used to set up selection of bits such that when the input word becomes available, the bit comparison can be completed.

As shown in FIG. 2, a selector circuit such as multiplexer 20 selects one of three inputs 22, 24, and 26 as its output 28 based on the logic state of three select inputs, 30, 32, and 34. Output 28 of multiplexer 20, denoted also as $\bar{e}_j$, is a bit level comparison of the $j^{th}$ mask bit, the $j^{th}$ input bit, and the $j^{th}$ reference bit, and may take on either logic state to indicate a comparison.

Only one of the three select inputs 30, 32, and 34 will be a logic high at any time due to the logic state of the three inputs 22, 24 and 26. When select input 30 is high, input 22 is selected as output 28 of multiplexer 20. Select input 30 is the mask bit $m_j$. When select input 32 is high, input 24 is selected as output 28 of multiplexer 20. Select input 32 is a logic combination of the mask bit $m_j$ and the reference bit $r_j$. NOR gate 36 combines mask bit $m_j$ with reference bit $r_j$ to generate an output that is select input 32. When select input 34 is high, input 26 is selected as output 28 of multiplexer 20. Select input 34 is also a logic combination of the mask bit $m_j$ and the reference bit $r_j$. NOR gate 38 combines mask bit $m_j$ with the inverse of the reference bit $r_j$ output from inverter 40 to generate an output that is select input 34.

Figure 1:
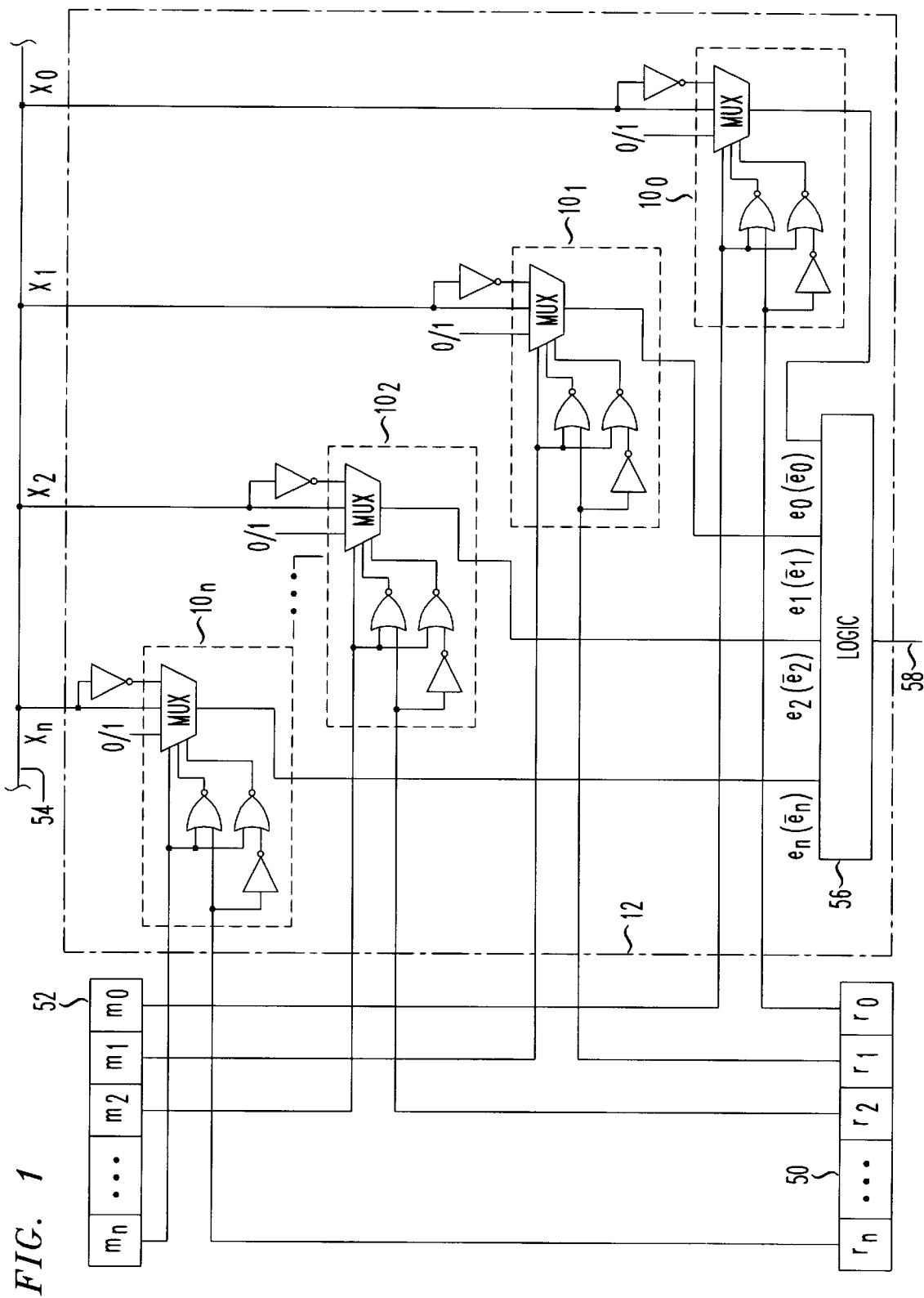
FIG. 1 is a simplified schematic diagram of a high speed digital comparator in accordance with the present invention.

A high speed comparator 12 for comparing two n-bit words is shown in FIG. 1. High speed comparator 12 includes a plurality of n bit-level comparators 10, one for each bit in the words being compared. A subscript has been added to reference numeral 10 in FIG. 1 to denote the bit position being compared by each bit-level comparator 10.

The reference word R is illustrated as being retained in a register 50, but the invention is not limited thereto. Mask word M is illustrated as being retained in register 52, but the invention is not limited thereto. Input word X is illustrated as being provided by bus 54 such as an address bus, but could also be provided from a register. The result of the bit level comparisons, $e_0$ through $e_n$, are combined in logic 56 to determine whether there is a match of all of the unmasked bits. Logic 56 produces a match comparison signal 58. Comparison signal 58, also denoted as E in equation (1), may take on a first logic state, such as a logic high, to indicate all of the unmasked bits match, and a second logic state, such as a logic low, to indicate not all of the unmasked bits match.

Figure 3:
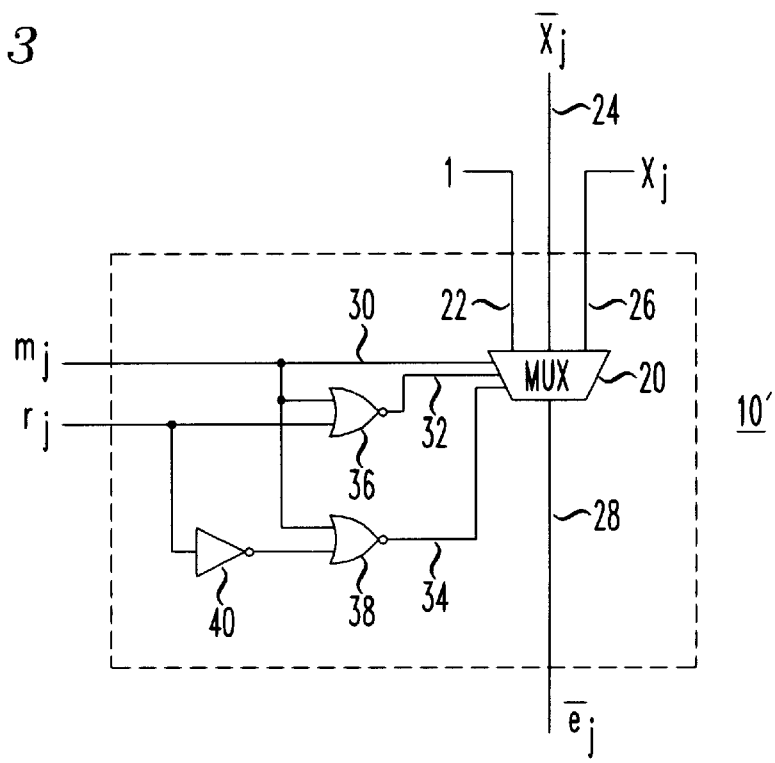
FIG. 3 is a simplified schematic diagram of an alternative embodiment bit-level comparator that is a dual of the bit-level comparator of FIG. 2, also for use in the comparator of FIG. 1.

Logic 56 may be a multiple input gate such as an AND or NOR gate. The logic 56 is dependent upon whether $e_j$ is generated, or $\bar{e}_j$, by bit-level comparators. When bit level comparator 10 of FIG. 2 is employed in comparator 12 of FIG. 1, each bit level comparator produces an $\bar{e}_j$ and logic 56 is a multiple input NOR gate. When $\bar{e}_j$ is generated, then logic 56 is a multiple input NOR gate wherein each input is bit level comparison $\bar{e}_j$. When bit level comparator 10' of FIG. 3 is employed in comparator 12 of FIG. 1, each bit level comparator produces an $e_j$ and logic 56 is a multiple input AND gate. When $e_j$ is generated, then logic 56 is a multiple input AND gate wherein each input is bit level comparison $e_j$. The bit level comparators of FIGS. 2 and 3 are duals of each other. Equation 1 is implemented using the bit level comparator of FIG. 2. A dual of equation 1, not illustrated, results in the bit level comparator of FIG. 3. In the circuit of FIG. 3, like the circuit of FIG. 2, the mask bits are represented as being active high, although the invention is not limited thereto.

The bit-level comparator 10 of the present invention provides a single element delay from the input of multiplexer 20 to the determination of the bit level comparisons. Once the bits of the input word are available, they need only pass through one multiplexer to select the bit level comparison $e_j$.

At each bit position, if the mask bit is set the bit position comparison for that bit position may be ignored. This is achieved by selecting as output $e_j$ the input 22. If the mask bit is not set, the input bit and reference bit are compared and the output $e_j$ is selected as either the input bit or its inverse. If all of the unmasked individual bits of the input word and the reference word match on a bit-by-bit basis, then the input word and reference word match.

While an illustrative embodiment of the invention has been described in which each of the input word, reference word, and mask word have the same number of bits, the invention is not limited thereto. Furthermore, while an illustrative embodiment of the invention has been described as providing a mask bit that takes on a logic state that is a logic high when the bit is masked, one skilled in the art could design a circuit in which a mask bit takes on a logic state that is a logic low when the bit is masked.

While the illustrative embodiment has used the descriptive terms input word, reference word, and mask word, any of the descriptors may be used to describe any of the three words being compared.

What is claimed is:

1. A comparator for comparing two multiple-bit words, comprising:

at least one selector circuit, the at least one selector circuit adapted to receive as first, second and third inputs a fixed state, an input bit and an inverse of the input bit, the at least one selector circuit adapted to receive first, second and third select inputs, the first select input being a mask bit, the second and third select inputs being a logical combination of the mask bit and a bit of one of the multiple-bit words, the at least one selector circuit adapted to select one of the inputs as an output depending upon which select input is active.

2. A comparator as recited in claim 1, further comprising:

a logic circuit adapted to receive and logically combine outputs from each at least one selector circuit, the logic circuit adapted to provide an output indicative of a bit-by-bit comparison of the two multiple-bit words.

3. A comparator as recited in claim 1, wherein said at least one selector circuit is a multiplexer.

4. A comparator as recited in claim 1, wherein the fixed state is selected as the output when the first select input is active.

5. A comparator as recited in claim 1, wherein the second state is selected as the output when the second select input is active.

6. A comparator as recited in claim 1, wherein the third input is selected as the output when the third select input is active.

7. A comparator as recited in claim 2, wherein the logic circuit comprises a NAND gate.

8. A comparator as recited in claim 2, wherein the logic circuit comprises a NOR gate.

9. A comparator as recited in claim 1, wherein a select input is active when in a logic low state.

10. A comparator as recited in claim 1, wherein a select input is active when in a logic high state.

11. A comparator as recited in claim 1, further comprising a NOR gate, the NOR gate adapted to generate one of said first and second select inputs.

12. A comparator as recited in claim 11, further comprising:

an inverter, the inverter adapted to receive as an input a bit of one of the two multiple-bit words, the inverter adapted to produce an output, the inverter output coupled as an input to the NOR gate.

13. A comparator as recited in claim 1, wherein the comparator is fabricated in an integrated circuit.

14. A comparator as recited in claim 13, wherein the integrated circuit is a microprocessor.

15. A comparator as recited in claim 13, wherein the integrated circuit is a microcontroller.

16. A comparator as recited in claim 13, wherein the integrated circuit is a digital signal processor.

17. A comparator for comparing two n-bit words, comprising:

a plurality of n selector circuits, each of the selector circuits adapted to receive as first, second, and third inputs a fixed state, an input bit and an inverse of the input bit, each of the selector circuits adapted to receive first, second and third select inputs, the first select input being a mask bit, the second and third select inputs being a logical combination of the mask bit and a bit of one of the two n-bit words, each selector circuit adapted to select one of the inputs as an output depending upon which select input is active.

18. A comparator as recited in claim 17, further comprising:
a logic circuit adapted to receive and logically combine the outputs from each of the plurality of selector circuits, the logic circuit adapted to provide an output indicative of a bit-by-bit comparison of the two n-bit words.

19. A comparator as recited in claim 17, wherein each selector circuit is a multiplexer.

20. A comparator as recited in claim 17, wherein the fixed state is selected as the output when the first select input is active.

21. A comparator as recited in claim 17, wherein the second input is selected as the output when the second select input is active.

22. A comparator as recited in claim 17, wherein the third input is selected as the output when the third select input is active.

23. A comparator as recited in claim 18, wherein the logic circuit comprises a NAND gate.

24. A comparator as recited in claim 18, wherein the logic circuit comprises a NOR gate.

25. A comparator as recited in claim 20, wherein a select input is active when in a low state.

26. A comparator as recited in claim 20, wherein a select input is active when in a high state.

27. A comparator as recited in claim 17, further comprising a NOR gate, the NOR gate adapted to one of said first and second select inputs.

28. A comparator as recited in claim 17, further comprising an inverter, the inverter adapted to receive as input a bit of one of the two n-bit words, the inverter adapted to produce an output, the inverter output coupled as an input to the NOR gate.

29. A method of comparing two n-bit words in a masked comparator, comprising the steps of:
providing a fixed state as a first input to a selector circuit;
providing a bit and a logical inverse of the bit of a first one of the two n-bit words as second and third inputs to the selector circuit;
providing a mask bit as a first select input to the selector circuit;
providing a first logical combination of the mask bit and a bit of a second one of the two n-bit words as a second select input to the selector circuit;
providing a second logical combination of the mask bit and the bit of the second one of the two n-bit words as a third select input to the selector circuit; and
selecting one of the inputs as an output of the selector circuit depending upon which select input is active.

30. The method of comparing two n-bit words as recited in claim 29, further comprising the step of:
providing the select inputs and the fixed state to the selector circuit prior to providing the second and third inputs to the selector circuit.

31. The method of comparing two n-bit words as recited in claim 30, further comprising the step of acquiring the first one of the two n-bit words from a bus.

32. A method of comparing two n-bit words in a masked comparator, comprising the steps of:
providing a fixed state as a first input to each of n selector circuits;
providing a bit and a logical inverse of the bit of a first one of the two n-bit words as second and third inputs to each of the respective n selector circuits;
providing one of n mask bits as a first select input to each of the respective n selector circuits;
providing a first logical combination of the $n^{th}$ mask bit and an $n^{th}$ bit of a second one of the two n-bit words as a second select input to each of the respective n selector circuits;
providing a second logical combination of the $n^{th}$ mask bit and the $n^{th}$ bit of the second one of the two n-bit words as a third select input to each of the respective n selector circuits; and
selecting one of the inputs of each of the n selector circuits as an output of each of the respective n selector circuits depending on which select input to each of the respective n selector circuits is active.

33. The method of comparing two n-bit words as recited in claim 32, further comprising the steps of
providing the select inputs and fixed state to each of the n selector circuits prior to providing the second and third inputs to each of the n selector circuits.

34. The method of comparing two n-bit words as recited in claim 33, further comprising the step of acquiring the first one of the two n-bit words from a bus.

35. The method of comparing two n-bit words as recited in claims 32, further comprising the step of:
logically combining the outputs from each of the n selector circuits to produce a comparison signal.

36. The method of comparing two n-bit words as recited in claim 35, wherein the logical combination is a logical AND.

37. The method of comparing two n-bit words as recited in claim 35, wherein the logical combination is a logical NOR.

* * * * *